US012293286B2

(12) United States Patent
Wu et al.

(10) Patent No.: US 12,293,286 B2
(45) Date of Patent: May 6, 2025

(54) GENERATING INPUT DATA FOR A MACHINE LEARNING MODEL

(71) Applicant: Visa International Service Association, San Francisco, CA (US)

(72) Inventors: Peng Wu, San Francisco, CA (US); Olawunmi George, San Francisco, CA (US); Quingguo Chen, San Francisco, CA (US); Yiwei Cai, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 1010 days.

(21) Appl. No.: 17/335,819

(22) Filed: Jun. 1, 2021

(65) Prior Publication Data

US 2022/0261632 A1 Aug. 18, 2022

(30) Foreign Application Priority Data

Feb. 18, 2021 (EP) .................................... 21157977

(51) Int. Cl.
*G06N 3/08* (2023.01)
*G06N 3/044* (2023.01)

(52) U.S. Cl.
CPC .............. *G06N 3/08* (2013.01); *G06N 3/044* (2023.01)

(58) Field of Classification Search
CPC .................................. G06N 3/08; G06N 3/044
See application file for complete search history.

(56) References Cited

U.S. PATENT DOCUMENTS

| 10,679,124 | B1 | 6/2020 | Corrado et al. | |
|---|---|---|---|---|
| 10,936,947 | B1* | 3/2021 | Flunkert | G06N 3/044 |
| 2017/0177703 | A1 | 6/2017 | Liu | |
| 2018/0300609 | A1* | 10/2018 | Krishnamurthy | G06N 3/044 |
| 2019/0098039 | A1* | 3/2019 | Gates | G16H 20/70 |
| 2020/0082269 | A1* | 3/2020 | Gao | G06F 7/483 |
| 2020/0104653 | A1 | 4/2020 | Solomon et al. | |

(Continued)

OTHER PUBLICATIONS

Lillicrap et al. (Backpropagation through time and the brain, Mar. 2019, pp. 82-89) (Year: 2019).*

(Continued)

*Primary Examiner* — George Giroux
(74) *Attorney, Agent, or Firm* — Kilpatrick Townsend & Stockton LLP

(57) ABSTRACT

A computer-implemented method includes, for each of a set of training dates: receiving, for each of a sequence of dates including the training date, an input data array representing values of a predetermined set of date-dependent features; receiving a target output corresponding to an evaluation of a predetermined metric at the training date; and performing an update routine including processing the input data array for each date using first layers of a neural network, processing a resulting intermediate data array using second layers of the neural network to generate a network output, and updating values of parameters of the neural network in in a direction of a negative gradient of an error between the target output and the network output. The data processing system is then arranged to generate an embedding array by processing an input data array for each of a given sequence of dates using the first layers of the neural network.

15 Claims, 7 Drawing Sheets

(56) References Cited

U.S. PATENT DOCUMENTS

2020/0125820 A1   4/2020  Kim et al.
2021/0398016 A1*  12/2021 Tsimerman ............ G06N 20/00
2022/0107852 A1*  4/2022  Kulkarni ................. G06F 9/542

OTHER PUBLICATIONS

Zhu et al. (What to Do Next: Modeling User Behaviors by Time-LSTM, Aug. 2017, pp. 3602-3608) (Year: 2017).*
Esling et al. (Time-series data mining, Dec. 2012, pp. 1-34) (Year: 2012).*
Bengio et al., "Representation Learning: A Review and New Perspectives", arXiv:1206.5538v3 [cs.LG], Apr. 23, 2014, 30 pages.
Kazemi et al., "Time2Vec: Learning a Vector Representation of Time", arXiv:1907.05321v1 [cs.LG], Jul. 11, 2019, 16 pages.
Babaev et al: "E.T.-RNN Applying Deep Learning to Credit Loan Applications" Proceedings of the 25th ACM Sigkdd International Conference on Knowledge Discovery & Data Mining, KDD '19, ACM Press XP058466343; Jul. 25, 2019; 8 Pages.
Oncharoen et al: "Deep Learning for Stock Market Prediction Using Event Embedding and Technical Indicators" 2018 5th International Conference on Advanced Informatics: Concept Theory and Applications (ICAICTA), IEEE, XP033450673; Aug. 14, 2018; 6 Pages.
Vosoughi et al: "Tweet2Vec: Learning Tweet Embeddings Using Character-level CNN-LSTM Encoder-Decoder" arxiv.org, XP080714846; Jul. 26, 2016; 4 Pages.

* cited by examiner

| F(D1) – Sat 3 Nov 2020 | | | F(D2) – Sun 4 Nov 2020 | |
|---|---|---|---|---|
| Day of week | 6 | | Day of week | 7 |
| Day of month | 3 | | Day of month | 4 |
| Month | 11 | | Month | 11 |
| Weekend? | 1 | | Weekend? | 1 |
| ⋮ | | | ⋮ | |
| UK bank holiday? | 0 | | UK bank holiday? | 0 |

| F(D3) – Mon 5 Nov 2020 | | | F(D4) – Tue 6 Nov 2020 | |
|---|---|---|---|---|
| Day of week | 1 | | Day of week | 2 |
| Day of month | 5 | | Day of month | 6 |
| Month | 11 | | Month | 11 |
| Weekend? | 0 | | Weekend? | 0 |
| ⋮ | | | ⋮ | |
| UK bank holiday? | 0 | | UK bank holiday? | 0 |

Fig. 1

GENERATING INPUT DATA FOR A MACHINE LEARNING MODEL

CROSS-REFERENCE TO RELATED APPLICATIONS

This application claims priority under 35 U.S.C. 119 to EP 21157977.6 filed on Feb. 18, 2021, the disclosure of which is herein incorporated by reference in its entirety for all purposes.

TECHNICAL FIELD

The present invention relates to generating input data for processing by a machine learning model. The invention has particular relevance to generating input data which encapsulates date-dependent information in a format suitable for processing by a machine learning model arranged to forecast time series data.

BACKGROUND OF THE INVENTION

Forecasting tasks typically involve processing time series data comprising evaluations of a metric or target outcome at a set of previous time points to train a forecasting model to predict values of the metric or target outcome at one or more future time points. Depending on the application, the time points may correspond to dates, weeks, months or years, etc. In some examples, forecasting tasks are treated as curve fitting problems in which a function or stochastic process is fitted to a set of time series data points, with time being treated as a sole input variable. In some forecasting tasks, the value of a metric is expected to be strongly affected by particular attributes of a date (or week, month, year etc.). For example, when forecasting a volume of financial transactions of a particular type taking place on a given date, it is likely to be relevant which day of the week the date falls on, whether that day is a weekend day, and whether the date corresponds to a public holiday. Although in principle a model which uses time as a sole input variable can be trained to account for such information (provided the model has sufficient learning capacity), in practice the volume of training data needed to train the model, and/or the time period over which the training data would need to be collected, can be prohibitive. Furthermore, forcing a model to infer patterns from data which could be easily anticipated a priori is not an efficient use of computational resources or time.

In view of the above issues, models have been developed in which the time input is augmented with a set of manually-selected features that are expected to be salient to a forecasting task at hand. Suitable models include deep neural network models, which are well-suited to multi-dimensional inputs and can have a high learning capacity and tend to be less sensitive to outliers than curve fitting methods. Recurrent neural network (RNN) models allow data points to be processed sequentially, and the output of the model associated with a given time point can depend on a sequence of data points of indeterminate length. FIG. 1 shows a set of date-dependent features F evaluated on four consecutive dates D1, D2, D3, D4. In this example, the set of features includes an integer feature taking values from 1 to 7 representing the day of the week, an integer feature taking values from 1 to 31 representing day of the month, an integer feature taking values from 1 to 12 representing the month of the year, and a large number of binary features (two of which are shown) taking values of 0 or 1 and each indicating whether or not the date is associated with a respective attribute (for example, whether the date corresponds to a weekend day and whether the date is a bank holiday in the United Kingdom). The features in the set are not necessarily independent of one another (for example, if the date falls on a Saturday, the date must also fall on a weekend day) and therefore the set of features includes a level of redundancy, but the features are nevertheless chosen to include any information which is expected to be salient to the forecasting task at hand. In FIG. 1, the date-related features are labelled to illustrate the semantic meaning of the features, but in practice the features would be represented by an unlabelled array of values, for example a vector. Due to the potentially large number of binary features, the arrays are likely to be high-dimensional (for example, including hundreds of entries) and sparse (because a significant proportion of the entries are expected to be zero).

In principle, providing feature arrays of the type described above as inputs to a forecasting model can encourage the forecasting model to learn the influence of the corresponding features on the value of a metric. However, in practice, training a model to determine the influence of date-dependent features from such arrays is challenging from an implementation point of view and can place excessive demands on computational resources. In particular, the sparsity of the feature arrays leads to an optimisation surface in which a global optimum is challenging to determine. Furthermore, even if such feature arrays are used, a forecasting model is likely to require a large volume of training data spanning a large temporal range in order to properly learn the influence of certain features. Such volumes of training data may not be available for a given forecasting task, or at least may not be available to an entity performing the forecasting task. Finally, even if such training data is available, the demands on computational resources for training the model, both in terms of processing and memory, are likely to be high due to the high dimensionality of the feature vectors and the nature of the optimisation surface.

BRIEF SUMMARY OF THE INVENTION

According to a first aspect of the invention, there is provided a computer-implemented method of training a data processing system to generate an embedding array having a first number of dimensions and representing information associated with a given date. The method includes, for each training date of a set of training dates: receiving, for each of a respective sequence of dates including the training date, a respective input data array having a second number of dimensions greater than the first number of dimensions and representing values of a predetermined set of date-dependent features; receiving a target output value corresponding to an evaluation of a predetermined metric at the training date; and performing an update routine. The update routine includes: processing the respective input data array for each date in the respective sequence of dates using a first one or more layers of a neural network to generate an intermediate data array. The intermediate data array has the first number of dimensions. The update routine further includes processing the intermediate data array using a second one or more layers of the neural network to generate a network output value; determining an error between the network output value and the target output value; and updating values of a set of parameters of the neural network in a direction of a negative gradient of the determined error between the network output value and the target output value. When the update routine has been performed for each training date of the set of training dates, the data processing system is arranged to generate the embedding array for the given date by processing a respective input data array for each of a given sequence of dates including the given date using the first one or more layers of the neural network.

By generating embedding arrays based on time series data consisting of evaluations of the predetermined metric at the set of training dates, the time series data is leveraged to capture date-related information that may be pertinent to a downstream forecasting task. In many situations, the time series data used to train the neural network will be confidential and accessible only to a first party, and the forecasting task will be performed by a second party which does not have access to the time series data. In these situations, the above method provides a means by which the second party performing the forecasting task can take advantage of information contained within the time series data, without the need for either party to share confidential data.

The embedding arrays generated using the method described above are by design lower-dimensional than the hand-crafted feature arrays used to generate the embedding arrays, and the embedding arrays are expected to be dense rather than sparse. The technical implementation issues discussed above in relation to the use of feature arrays as input data are thus mitigated by the above method, resulting in forecasting which, as well as being likely to produce more accurate results, places lower demands on computing resources including processors and memory.

According to a second aspect of the invention, there is provided a data processing system comprising processing circuitry and memory circuitry. The memory circuitry holds machine readable instructions which, when executed by the processing circuitry, cause the data processing system to perform a method as described above.

Further features and advantages of the invention will become apparent from the following description of preferred embodiments of the invention, given by way of example only, which is made with reference to the accompanying drawings.

BRIEF DESCRIPTION OF THE DRAWINGS

FIG. 1 shows schematically a set of hand-selected date-dependent features for four consecutive dates;

DETAILED DESCRIPTION OF THE INVENTION

Figure 2:
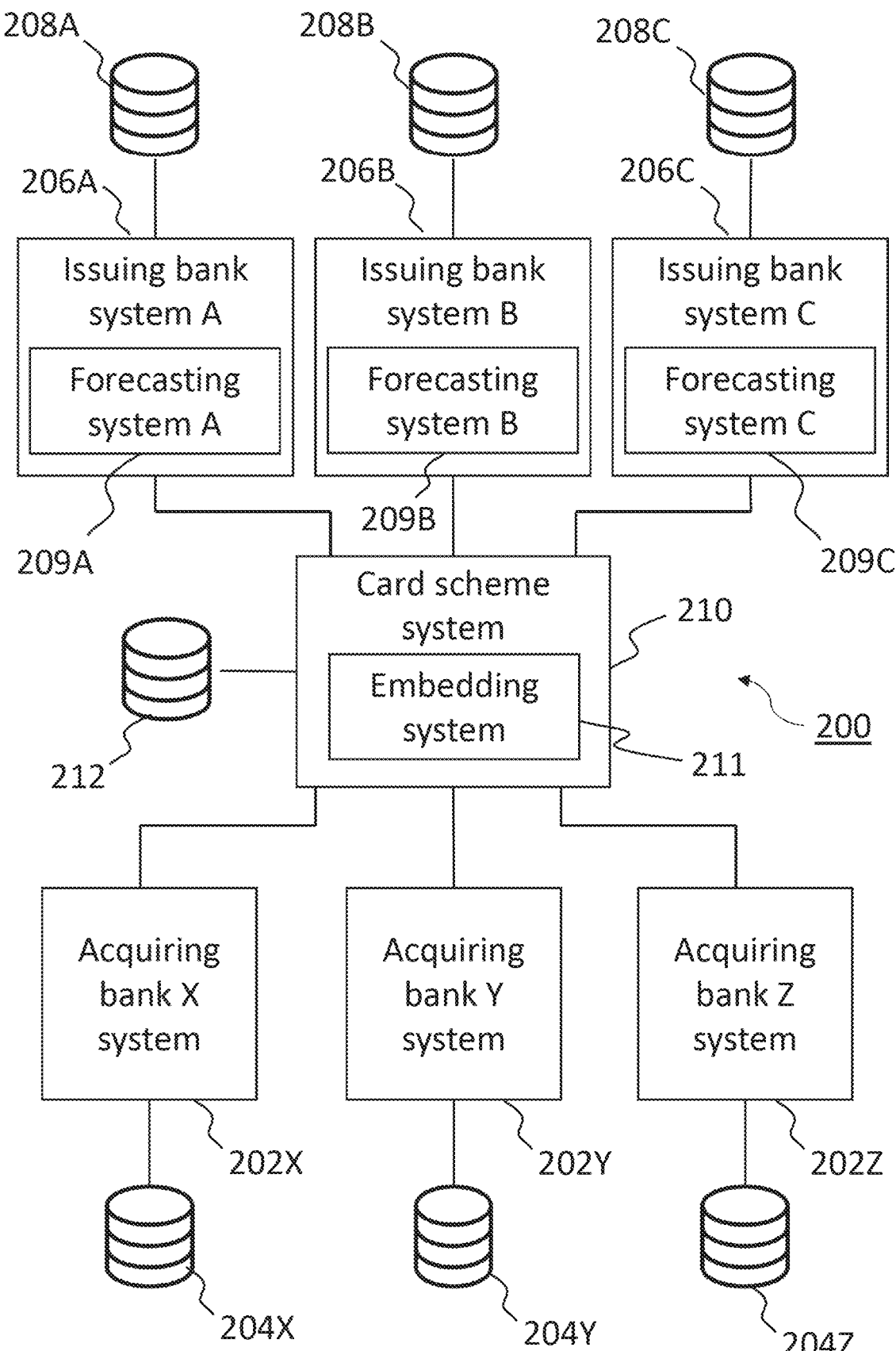
FIG. 2 shows schematically a payment processing system arranged in accordance with present disclosure.

FIG. 2 shows schematically an example of a payment processing network 200 in which acquiring banks X, Y and Z accept, on behalf of respective merchants, payments from cardholders using payment cards associated with issuing banks A, B and C. Settlement of funds is effected between the acquiring banks X, Y and Z and the issuing banks A, B and C via a card scheme network. Each of the acquiring banks X, Y, Z maintains a respective acquiring bank system 202X, 202Y, 202Z, which includes one or more servers and other networked devices, along with an associated database 204X, 204Y, 204Z arranged to store data relating to transactions involving the acquiring bank X, Y, Z. Similarly, each of the issuing banks A, B, C maintains a respective issuing bank system 206A, 206B, 206C and an associated database 208A, 208B, 208C for storing data relating to transactions involving the issuing bank A, B, C. In the present example, each of the issuing bank systems 206A, 206B, 206C includes a respective forecasting system 209A, 209B, 209C arranged to process data stored in the corresponding database 208A, 208B, 208C, in order to make predictions relating to future transactions as will be explained in more detail hereafter. The card scheme network provider maintains a card scheme system 210 and associated database 212 for storing data associated with transactions involving the card scheme network.

It will be appreciated that the number of transactions involving the card scheme network is greater than the number of transactions involving any one of the acquiring banks X, Y, Z or any of the issuing banks A, B, C, and as such the volume of transaction data stored by the card scheme database 212 will be higher than the volume of transaction data stored in the databases of any of the banks A, B, C, X, Y or Z. Furthermore, the data stored by each of the parties involved in the system of FIG. 2 is confidential. In particular, data stored in the card scheme database 212 relating to transactions involving any one of the banks A, B, C, X, Y, Z cannot be shared with any of the banks A, B, C, X, Y, Z. It is therefore not straightforward for any party in the payment processing network (or any other party) to take advantage of the transaction data stored in the database 212, for example for the purpose of forecasting future transaction volumes. Such forecasting is important, for example when forecasting liquidity volumes in order to eliminate "short cash" in which insufficient funds are available for settlement, and to mitigate "wasted cash" in which excess funds are held in an account. In order to be able to leverage the data stored in the card scheme database 212 to assist with forecasting tasks performed by third parties (such as the issuing banks A, B, C), the card scheme system 210 includes an embedding system 211. In this example, the embedding system 211 is arranged to process data stored in the card scheme database 212 to generate input data for provision to one or more of the issuing bank systems 206A, 206B, 206C, as will be explained in more detail hereafter.

Figure 3:
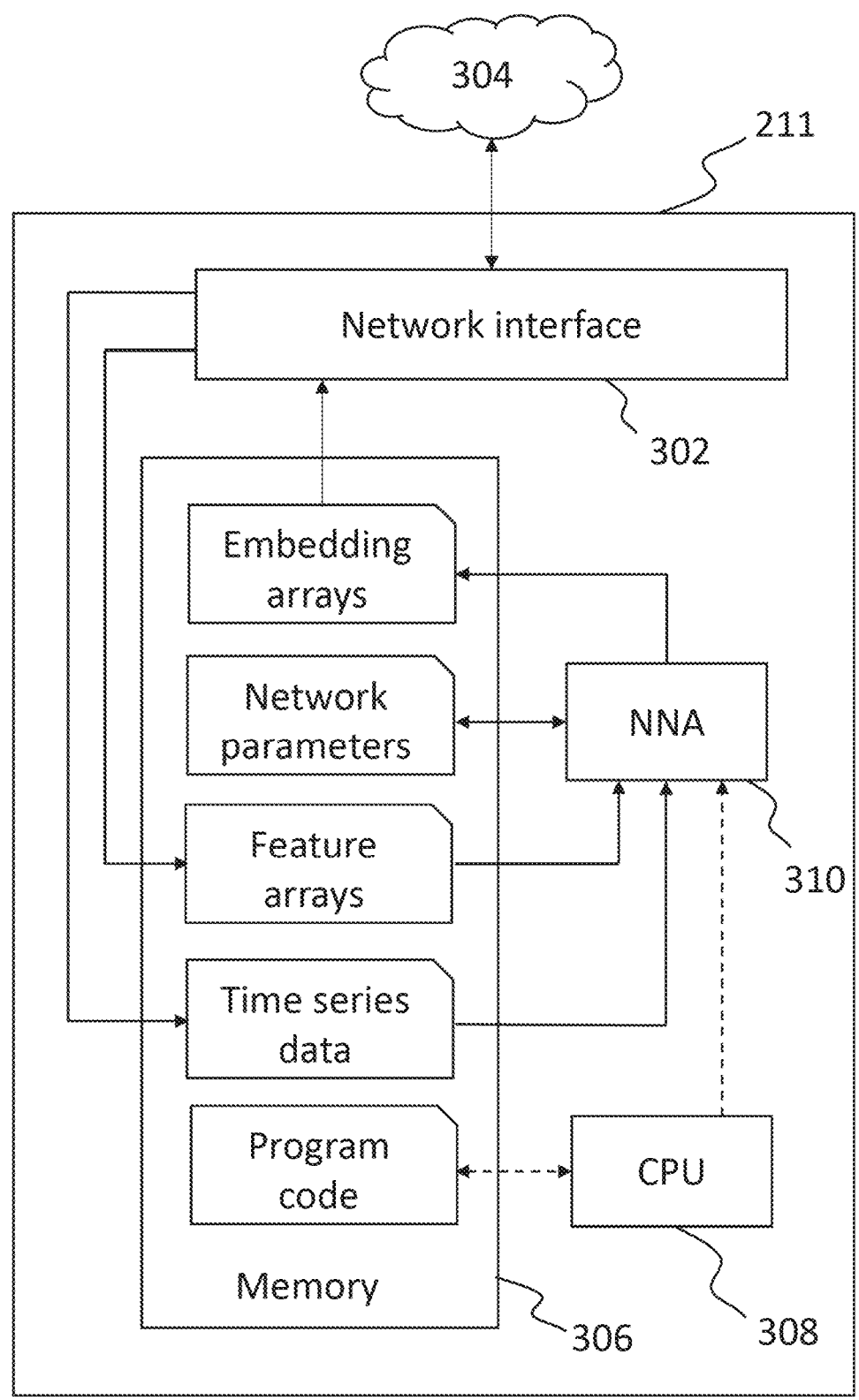
FIG. 3 shows schematically an example of a data processing system arranged to generate input data for a forecasting model.

As shown in FIG. 3, the embedding system 211 includes a network interface 302 for communicating with other components of the card scheme system 210 and the card scheme database 212 over a private network 304. The embedding system further includes memory circuitry 306, which in this example includes non-volatile storage in the form of a solid-state drive (SSD). In other examples, a data processing system may additionally or alternatively include a hard disk drive and/or removable storage devices. The memory circuitry 306 further includes working memory in the form of volatile random-access memory (RAM), in particular static random-access memory (SRAM) and dynamic random-access memory (DRAM). The embedding system 211 further includes processing circuitry, which in this example comprises a central processing unit (CPU) 308 and a neural network accelerator (NNA) 310. The NNA 310, also referred to as a neural processing unit (NPU), is a specialist processing unit with multiple processing nodes arranged for efficient parallelised implementation of neural network processing. The CPU 308 is arranged to send instructions to the NNA 310 in accordance with program code stored in the memory 306, causing the NNA 310 to process data stored in the memory 306 as will be described in more detail hereafter. In other examples, data processing system may include additional or alternative processing circuitry, for example in the form of a graphics processing unit (GPU), a field programmable gate array (FPGAs), and/or an application-specific integrated circuit (ASIC). In use, the embedding system 211 processes feature arrays comprising data-related features, along with time series data stored in the card scheme database 212, to generate embedding arrays for use as input data for the forecasting systems 209A, 209B, 209C operated by the issuing banks A, B, C.

Figure 4:
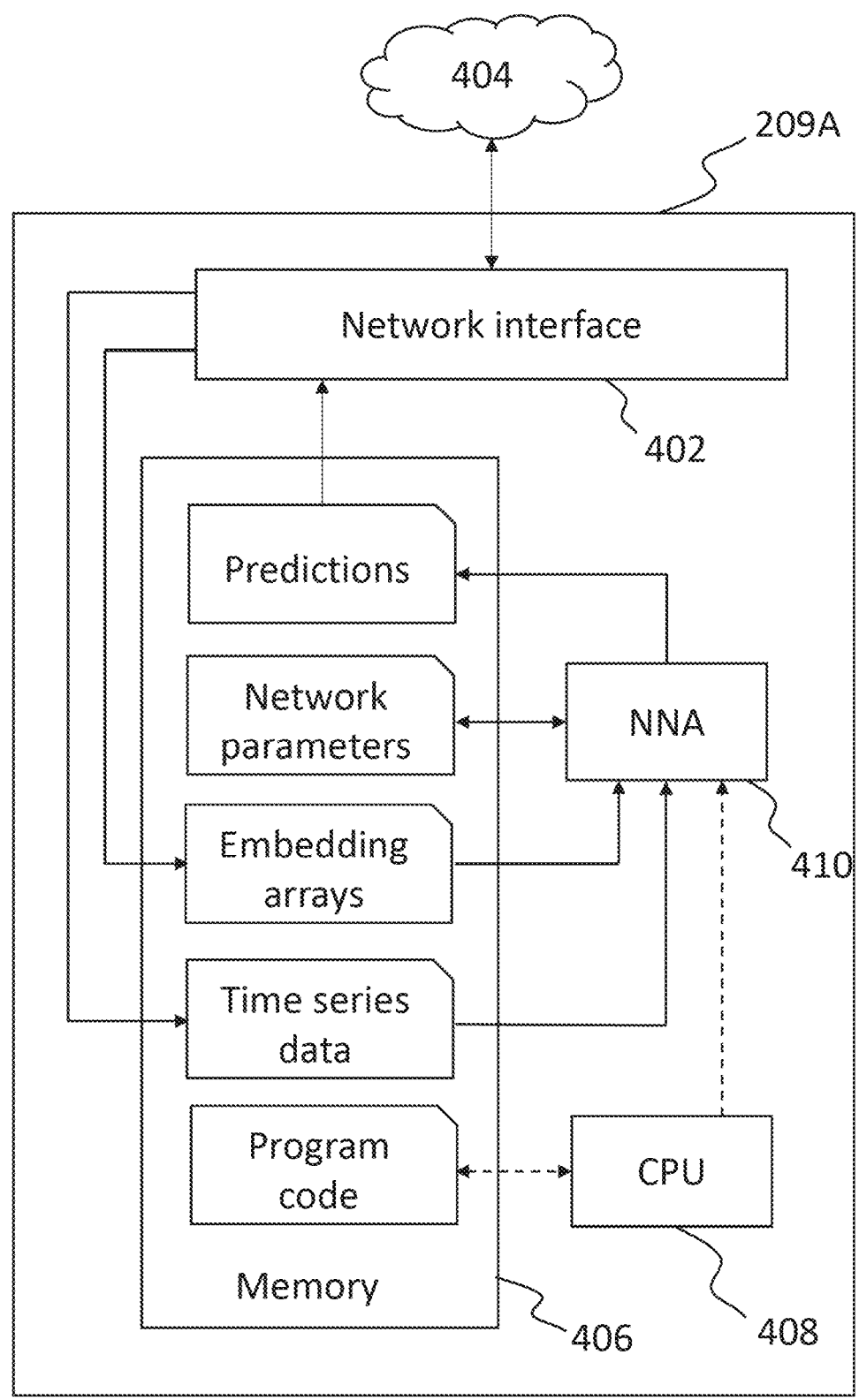
FIG. 4 shows schematically an example of a data processing system arranged to forecast values of a metric using a forecasting model.

FIG. 4 shows schematically the forecasting system 209A operated by the issuing bank A. The forecasting system 209A in this example is arranged to implement a neural-network based forecasting model, and as such has similar hardware components to the embedding system 211, including a network interface 402 for communicating with other components of the issuing bank system 206A and the associated database 208A, memory circuitry 406 and processing circuitry including a CPU 408 and a neural network accelerator 410. The forecasting systems 209B, 209C operated by the issuing banks B, C may be similarly arranged or may have different components, for example suitable for implementing different types of forecasting model. In use, the forecasting system 209A processes embedding arrays generated by the embedding system 211, along with time series data stored in the database 208A, to generate predictions of values of one or more financial metrics of interest to the issuing bank A.

Figure 5:
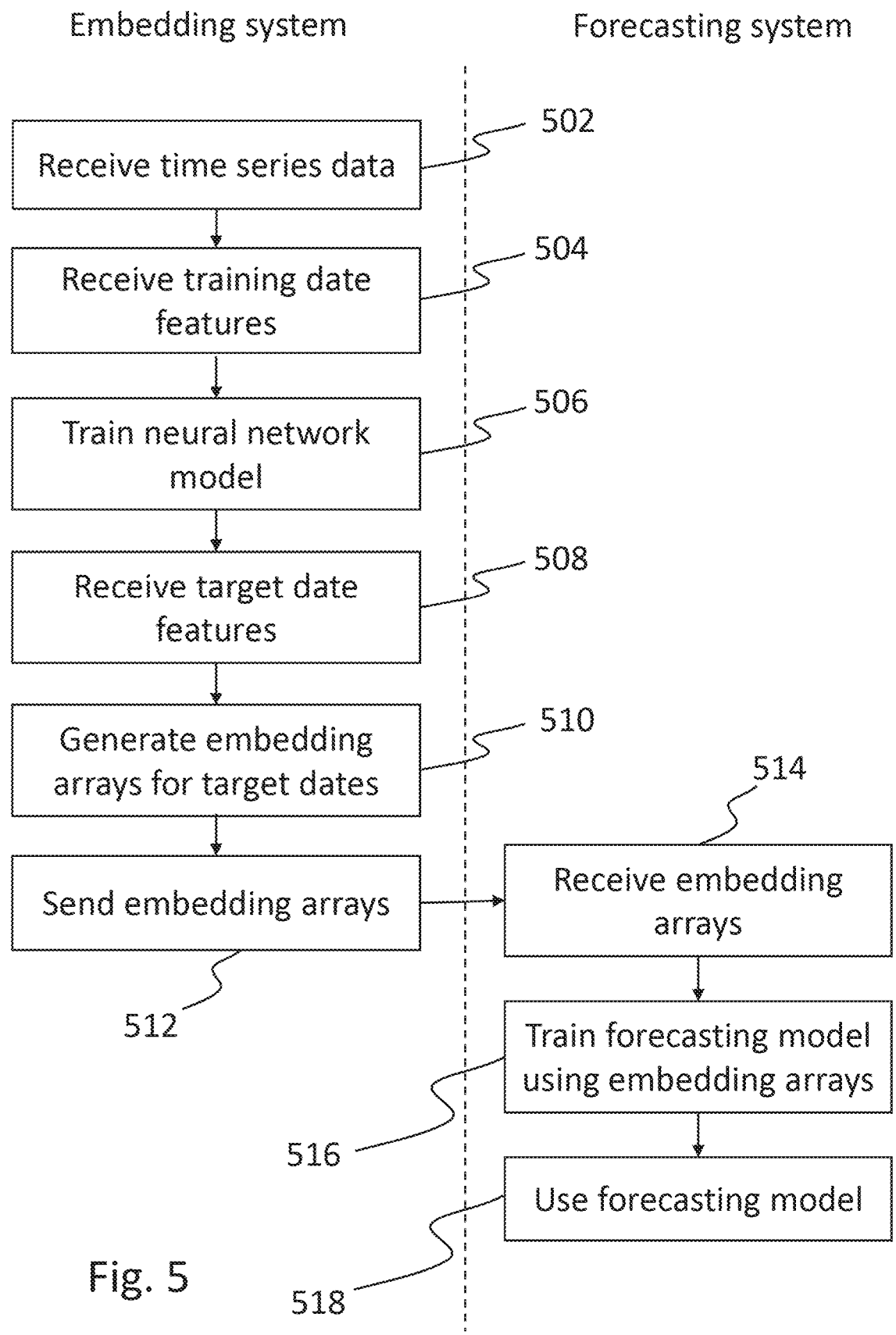
FIG. 5 is a flow diagram representing an example of a method for forecasting time series data in accordance with the present disclosure.

FIG. 5 shows an example of an end-to-end method of performing a forecasting task in accordance with the present disclosure. The first steps of the method are performed by the embedding system 211 of FIGS. 2 and 3, and later steps are performed by the forecasting system 209A of issuing bank A. The embedding system 211 receives, at 502, time series data from the card scheme database 212. The time series data includes evaluations of one or more predetermined training metrics at a set of training dates. These evaluations are referred to hereafter as target output values. In the present example, the target output values are based on transaction data relating to transactions between acquiring bank systems 202 and issuing bank systems 206, but in other contexts could be derived from transactions or events involving other parties or types of institution. Examples of training metrics include foreign exchange (forex, FX) net volume, FX buy volume, FX sell volume, cross-border (XB) transaction volume, or domestic transaction volume. The time series data may correspond to evaluations of a training metric for a specific industry or business domain (for example, the hotel industry, the restaurant industry, or e-commerce), in cases where embedding arrays are to be generated for a party involved in that industry or business domain. The time series data will typically correspond to dates spanning many days, for spanning several months or several years. Advantageously, the time series data should span a sufficient extent of time for date-dependent patterns to be present within the data, for example weekly, monthly and/or annual patterns, as well as phenomena relating to "special" dates such as bank holidays.

The embedding system 211 receives, at 504, feature arrays corresponding to a set of dates including the training dates (and possibly other dates before, after or between the training dates). The features arrays may, for example, vectors with entries in an integer and/or binary number format indicating values of the date features. As discussed above with reference to FIG. 1, the feature arrays are likely to be sparse and possibly high-dimensional, and should be designed to include any feature which is expected to be relevant to a forecasting task of interest.

Figure 6:
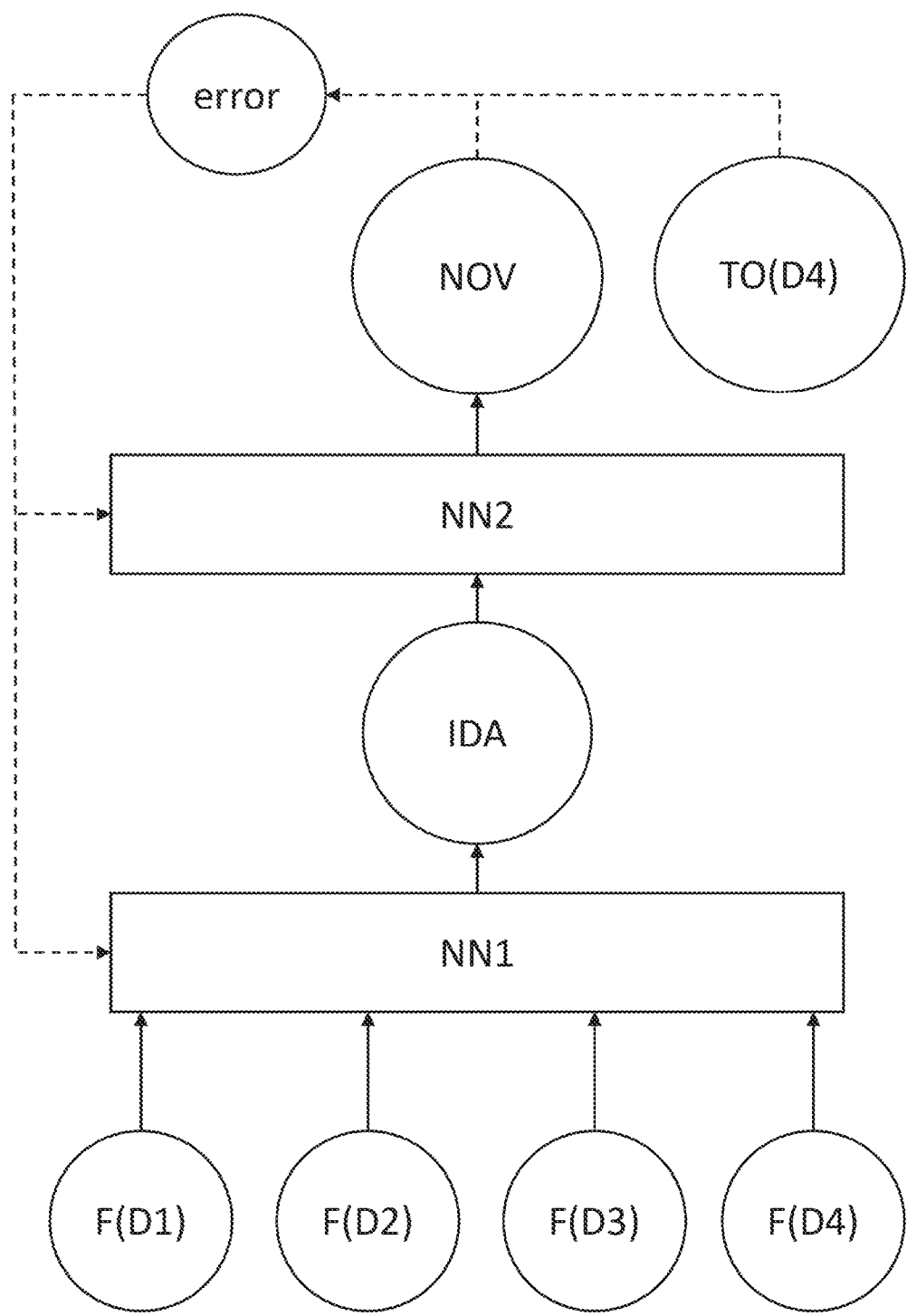
FIG. 6 shows schematically a neural network being trained to generate input data for a forecasting model in accordance with the present disclosure.

The embedding system 211 processes, at 506, the received time series data and feature arrays to train a deep neural network model to generate embedding arrays. FIG. 6 shows an example of a suitable deep neural network architecture. The deep neural network includes a first set of layers NN1 arranged to process feature arrays for a sequence of dates to generate an intermediate data array. In the example shown, the first set of layers NN1 processes four feature arrays F(D1), F(D2), F(D3), F(D4) representing values of a set of date-dependent features for a sequence of consecutive dates D1, D2, D3, D4, and outputs an intermediate data array IDA. Depending on the specific network architecture, the first set of layers NN1 may be arranged to receive a fixed number of feature arrays simultaneously, or advantageously may have a recursive neural network (RNN) configuration for receiving an indeterminate number of feature arrays sequentially. By using a suitable RNN architecture for the first set of layers NN1, the neural network can learn the short-, medium- and long-term effect of date features on values of a training metric, without any a priori knowledge of such effects. Specific configurations for the first set of layers NN1 will be discussed in more detail hereinafter.

The deep neural network of FIG. 6 includes a second set of layers NN2 arranged to process the intermediate data array IDA generated by the first set of layers NN1 to generate a network output value NOV. The second set of layers NN2 may include one or more layers. In an example, the second set of layers NN2 includes multiple fully-connected layers, though it will be appreciated that other architectures may be used without departing from the scope of the invention. In this example, the output of the second set of layers NN2 is a single numerical value, but in other examples the output of the second set of layers may have multiple components.

During training, the network output value is compared with a target output value to determine an error between the network output value and the target output value. In the example shown, the network output value NOV is compared with a target output value TO(D4) which is an evaluation of a training metric at the date D4. In this example, the target output value is associated with the last date in the sequence of dates D1, D2, D3, D4. In other examples, the target output value may correspond to a date other than the last date in a sequence, for example the first date or one of the middle dates. In an example where the network output value has multiple components, each of the components may be compared with a respective target output value corresponding to an evaluation of a respective different training metric at a given date. The determined error is backpropagated through the second set of layers NN2 and the first set of layers NN1 of the neural network to determine a gradient of the error with respect to parameters of the neural network (for example, connection weights and bias values). In examples using an RNN architecture for the first set of layers NN1, backpropagation through time may be used to determine the gradient of the error. The values of the parameters are updated in dependence on the determined gradient, using gradient descent or a variant thereof, such that the parameter values after the update would result in a lower error. The updating of the parameter values may be performed iteratively for the same training date until a stopping condition is satisfied (for example when a predetermined number of iterations has been performed, or when the error or the gradient of the error has decreased by a certain amount), or may be performed once for a given training date before moving onto a different training date.

When the above routine has been performed once or more for each training date of the set of training dates, the resulting trained values of the network parameters are stored in the memory 306 of the embedding system 211, for use in generating embedding arrays as described below.

The embedding system 211 receives, at 508, feature arrays corresponding to dates including a set of target dates (and possibly other dates before, after or between the target dates). The target dates are those relevant to a downstream forecasting task, for example because time series data is available to the forecasting party for those dates or because it is desired to forecast a given variable on those dates. The set of target dates may include at least some of the training dates used to train the neural network, and/or may include dates which are not included within the set of training dates. For example, where a forecasting task involves predicting a quantity of interest for an upcoming period, based on time series data comprising measurements of said quantity of interest over a previous period, the set of target dates may include all of the dates in the previous period for which measurements of the quantity are available, as well as any dates in the upcoming period for which predictions are to be made. Depending on the spacing of the target dates, feature arrays for additional dates may also be received, for example sequences of consecutive dates which contain the target dates.

Figure 7:
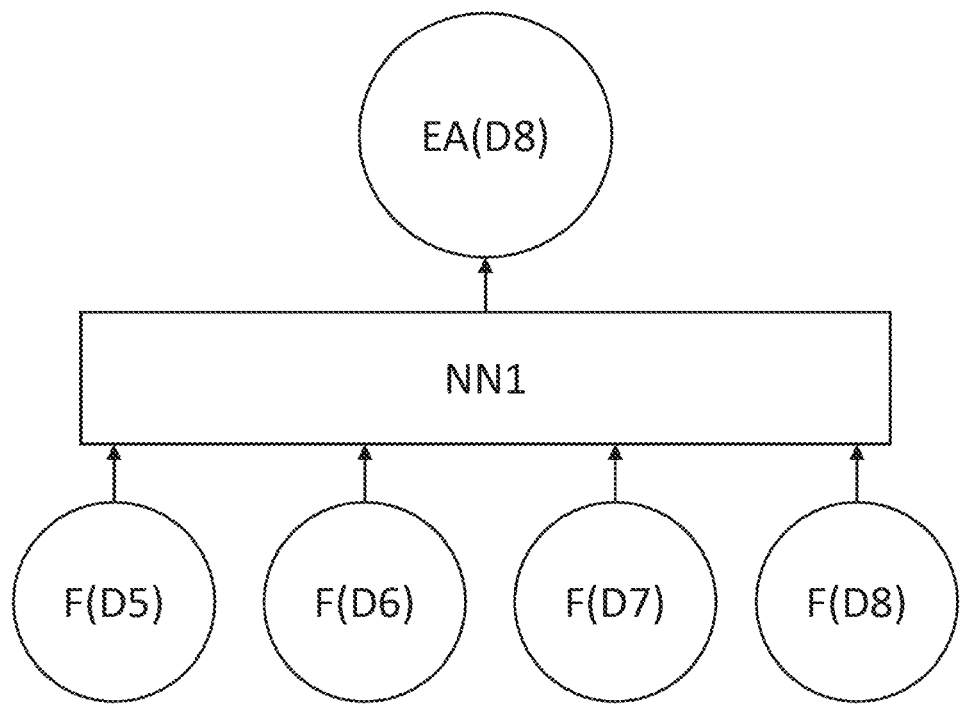
FIG. 7 shows schematically the neural network of FIG. 6 being used to generate input data in accordance with the present disclosure.

The embedding system 211 processes, at 510, the feature arrays received at 408, using the first set of neural network layers NN1 with the trained values of the network parameters, to generate an embedding array for each of the target dates. The embedding arrays are dense, fixed-dimensional arrays that capture date-related information salient to the training metric on which the neural network is trained. The embedding arrays may, for example, have 8, 10, 12, 16, 32, or any other suitable number of dimensions. In the example of FIG. 7, the first set of layers NN1 processes four feature arrays F(D5), F(D6), F(D7), F(D8) for a sequence of consecutive dates D5, D6, D7, D8, where D8 is a target date, and outputs an embedding array EA(D8) corresponding to the target date D8. The embedding array for a target date may depend on features not only of the target date, but also on features of other dates surrounding the target date. The embedding arrays may therefore contain information pertaining to relationships with surrounding dates, allowing the embedding arrays to capture information not contained within the feature arrays from which the embedding arrays are derived. As discussed above, the first set of neural network layers NN1 may have an RNN configuration arranged to receive feature arrays sequentially, in which case the first set of neural network layers may process feature arrays corresponding to any number of dates, including the target date, to generate the embedding array for the target date.

In the present example, once the embedding arrays have been generated for each of the target dates, the embedding arrays are transmitted, at 512, to the forecasting system 209A. As explained above, the forecasting system 209A is operated by a different entity to that which operates the embedding system 211, and in this example the two entities are unwilling or unable to share confidential data with one another, including the time series data used to generate the embedding arrays. Advantageously, the embedding arrays contain no information from which values of the time series data could be inferred, so the confidentiality of the time series data is not compromised by the transmitting of the embedding arrays. Although the forecasting system 209A in this example is a component of the issuing bank system 206A, in other examples a forecasting system could be a component of an acquiring bank system or could be a separate system altogether.

The embedding arrays are received by the forecasting system 209A at 514. The forecasting system 209A processes, at 516, the embedding arrays to train a forecasting model. The forecasting model may be, for example, a further neural network model or may be any other suitable type of model, for example a Gaussian process regression model, a linear regression model, a logistic regression model, and so on. During training, an embedding array corresponding to a given date is associated with a time series data point corresponding to an evaluation of a forecasting metric on the given date. The forecasting model is then trained using supervised learning with the time series data points as targets. The forecasting model thereby learns to process an embedding array to generate an output value which is an accurate prediction of the forecasting metric on the date to which the embedding array corresponds. The exact training method will depend on the type of forecasting model. For example, where the forecasting model is implemented as a neural network, backpropagation of errors and gradient descent may be used to train the forecasting model. Where the forecasting model is a Bayesian model such as a Gaussian process model, maximum likelihood estimation, maximum a priori (MAP) estimation, and/or variational inference may be used to train the forecasting model. In some examples, a forecasting model may be trained to generate a prediction on the basis of a set of multiple embedding arrays corresponding to sequence of dates, for example using an RNN architecture.

The forecasting system 209A processes, at 518, an embedding array corresponding to a given date, using the trained forecasting model, to predict a value of the forecasting metric on the given date. It will be appreciated that the resulting prediction takes into account not only the training data stored in the issuing bank database 212A, but also the date dependence of the training data stored in the card scheme database 212, without any confidential data having to be transferred between the systems. As explained above, the card scheme database 212 stores more transaction data than any other party in the payment processing network 200. Using embedding arrays based on this rich dataset as input data for a forecasting model is expected to lead to improved performance of the forecasting model, even when a relatively small volume of time series data is stored by the forecasting party.

The method described above involves generating input date for a forecasting model based on training data comprising evaluations of a given training metric. In some examples, separate instances of the neural network model may be trained using target values corresponding to different training metrics. The resulting embedding arrays generated by the different instances will generally encapsulate information relevant to the particular training metrics on which the respective instances are trained. For certain downstream forecasting tasks, it is expected that only particular embedding arrays will be relevant (those for which the corresponding training metric is expected to be relevant to the forecasting task). In other examples, multiple sets of embedding arrays may be relevant to a given forecasting task, or it may be unclear which set of embedding arrays will be relevant. In this case, multiple embedding arrays may be generated for each target date, each corresponding to a different training metric, and these embedding may then be combined to generate a combined embedding array for each target date. Combining the embedding arrays may include, for example, concatenating or interleaving the embedding arrays, pooling of feature values, or generating linear combinations of feature values. If the combined embedding arrays are used to train the forecasting model, the forecasting model may then learn to take into account information in any or all of the component embedding arrays.

Figure 8:
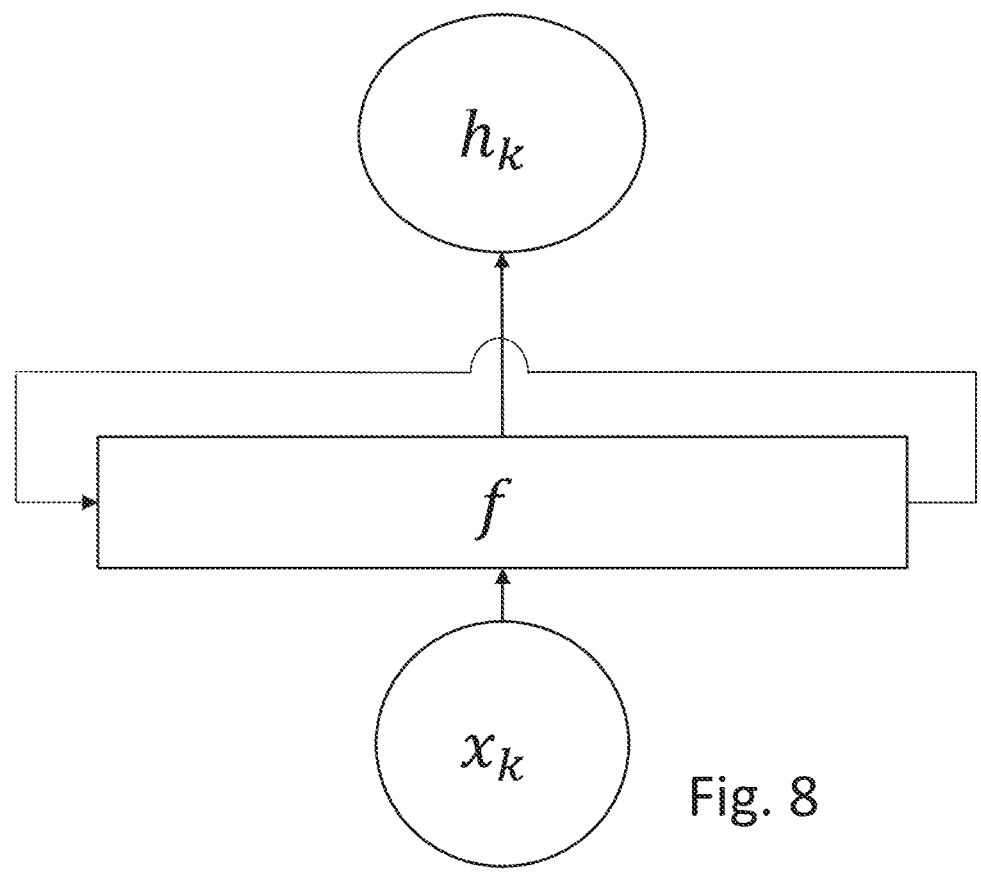
FIG. 8 shows an example of a recurrent neural network architecture suitable for use in the neural network of FIGS. 6 and 7.

As mentioned above, the first set of layers NN1 of the neural network for generating embedding arrays may be arranged in an RNN configuration. FIG. 8 shows an example in which feature arrays $x_k$ for k=1, 2, . . . , K corresponding to a sequence of dates $D_k$ for k=1, 2, . . . , K are processed sequentially by a set of layers f to generate an embedding array corresponding to the last date $D_K$ in the sequence. In this example, the output $h_k$ associated with date $D_k$ depends on the feature array $x_k$ corresponding to the date $D_k$, and also on the output $h_{k-1}$ associated with the previous date $D_{k-1}$, such that $h_k=f(h_{k-1}, x_k)$. The feature arrays are processed sequentially in chronological order, with information persisting in the network each time a new feature array is processed. When the feature arrays for the entire sequence of dates have been processed sequentially in this way, the output $h_K$ of the set of layers f is the embedding array for the date $D_K$. In a specific example, the RNN includes a long short-term memory (LSTM) unit having multiple layers or gates. An LSTM unit includes at least an input gate, an output gate and a forget gate, which together control the information that persists within the LSTM unit (the persisting information is referred to as a cell state). Various different arrangements of LSTM unit are known in the art, for example the peephole LSTM unit and the gated recurrent unit (GRU), and any of these may be used without departing from the scope of the present disclosure. LSTM networks may be trained using stateful training or stateless training. Compared with some other types of RNN architecture, LSTM units are adept at capturing long-term dependencies within data.

The above embodiments are to be understood as illustrative examples of the invention. Further embodiments of the invention are envisaged. For example, although in the examples described above the embedding arrays are provided to a remote system performing the forecasting task, in another example the generating of the embedding arrays and the performing of the forecasting task may be performed using a single system, or by systems operated by a single entity. In this case, data confidentiality is not an issue, but the generating of the embedding arrays still addresses the technical issues associated with the use of feature arrays as input data, and further provides a way to harness rich data associated with evaluations of one or more metrics to provide information for forecasting values of other metrics, for which such rich data may not be available. Furthermore, although the example of FIG. 2 involves issuing banks and acquiring banks in a payment processing network, the methods described herein may be implemented for transactions between other financial institutions. For example, in the context of cross-border payments, it is advantageous for banks or financial institutions involved in such transaction be able to predict settlement payment volumes in advance in order to eliminate short cash and mitigate waste cash during prefunding. For example, FX volume data for currencies on either or both sides of the border may be used as training data (target output values) for generating suitable embedding arrays. As mentioned above, embedding arrays may be generated using training data pertaining to a specific industry or business domain, such that the embedding arrays contain information specific to that industry or business domain and are therefore suitable to be provided to parties involved in that industry of business domain. Finally, the present method is not limited for use with financial transaction data, and may be applied to any situation in which time-series data is to be predicted or forecasted and in which time- or date-dependent features are expected to be relevant.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A computer-implemented method comprising:
   training a data processing system to generate a plurality of embedding arrays for a set of target dates, each of the plurality of embedding arrays having a first number of dimensions and representing information associated with a respective target date of the set of target dates, the training comprising, for each sequence of dates including training dates from a set of training dates:
   receiving, for each training date of a respective sequence of dates, a respective input data array, wherein each respective input data array is received sequentially in a chronological order based on the training dates of the respective sequence of dates, each respective input data array having a second number of dimensions greater than the first number of dimensions and representing values of a predetermined set of date-dependent features;
   receiving a target output value corresponding to an evaluation of a predetermined metric for each training date; and
   performing an update routine comprising:
      processing each respective input data array sequentially received for each training date in the respective sequence of dates using first one or more layers of a neural network to generate an intermediate data array for a last training date in the respective sequence of dates, wherein the intermediate data array has the first number of dimensions,
      processing the intermediate data array using second one or more layers of the neural network to generate a network output value,
      determining an error between the network output value and the target output value for the last training date in the respective sequence of dates, and
      updating values of a set of parameters of the neural network in a direction of a negative gradient of the determined error between the network output value and the target output value,
   wherein, when the update routine has been performed for each training date of the set of training dates, the trained first one or more layers are obtained, and wherein the computer-implemented method further comprises:
generating, by the data processing system, the plurality of embedding arrays using the trained first one or more layers, by processing respective target input data arrays, each respective target input data array corresponding to the respective target date of the set of target dates, wherein, as a result of the processing by the trained first one or more layers, each of the plurality of embedding arrays that corresponds to the respective target date is dependent on the respective input data array for the target date and dates other than the target date in the set of target dates; and
transmitting the plurality of embedding arrays to a remote computing system over a network, for training a forecasting model.

2. The computer-implemented method of claim 1, wherein the first one or more layers of the neural network include one or more recurrent neural network layers.

3. The computer-implemented method of claim 2, wherein the first one or more layers of the neural network include at least one long short-term memory unit.

4. The computer-implemented method of claim 1, wherein the respective target date is a training date of the set of training dates.

5. The computer-implemented method of claim 1, wherein for each training date of the set of training dates, the target output value corresponds to an evaluation of a financial metric at the training date.

6. The computer-implemented method of claim 1, wherein the
plurality of embedding arrays are generated using respective different target output values corresponding to evaluations of respective different predetermined metrics at the training date, the computer-implemented method further comprising:
combining the plurality of embedding arrays for the respective target date into a combined embedding array for the respective target date.

7. The computer-implemented method of claim 1, further comprising processing the plurality of embedding arrays, using supervised learning, to train the forecasting model to predict values of a date-dependent variable on a given target date, based on inputs including an embedding array for a given target date.

8. The computer-implemented method of claim 1, further comprising, at the remote computing system:
receiving the plurality of embedding arrays; and
receiving a set of training values corresponding to evaluations of a forecasting metric at past dates corresponding to a subset of the plurality of embedding arrays;
processing the set of training dates and said subset of the plurality of embedding arrays using supervised learning to train the forecasting model to predict values of the forecasting metric on a given target date based on input data including an embedding array for the given target date; and
processing one or more of the plurality of embedding arrays using the trained forecasting model to predict values of the forecasting metric on dates corresponding to said one or more of the plurality of embedding arrays.

9. A data processing system comprising processing circuitry and memory circuitry, wherein the memory circuitry holds machine readable instructions which, when executed by the processing circuitry, cause the data processing system to execute a method including:
performing processing to generate a plurality of embedding arrays for a set of target dates, each of the plurality of embedding arrays having a first number of dimensions and representing information associated with a respective target date of the set of target dates, the performing the processing including, for each sequence of dates including training dates from a set of training dates:
receiving, for each training date of a respective sequence of dates, a respective input data array, wherein each respective input data array is received sequentially in a chronological order based on the training dates of the respective sequence of dates, each respective input data array having a second number of dimensions greater than the first number of dimensions and representing values of a predetermined set of date-dependent features;
receiving a target output value corresponding to an evaluation of a predetermined metric for each training date; and
performing an update routine including:
processing each respective input data array sequentially received for each training date in the respective sequence of dates using first one or more layers of a neural network to generate an intermediate data array for a last training date in the respective sequence of dates, wherein the intermediate data array has the first number of dimensions,
processing the intermediate data array using second one or more layers of the neural network to generate a network output value;
determining an error between the network output value and the target output value; for the last training date in the respective sequence of dates, and
updating values of a set of parameters of the neural network in a direction of a negative gradient of the determined error between the network output value and the target output value,
wherein, when the update routine has been performed for each training date of the set of training dates, the trained first one or more layers are obtained, and
wherein the method further includes:
generating the plurality of embedding arrays using the trained first one or more layers, by processing respective target input data arrays, each respective target input data array corresponding to the respective target date of the set of target dates, wherein, as a result of the processing by the trained first one or more layers, each of the plurality of embedding arrays that corresponds to the respective target date is dependent on the respective input data array for the target date and dates other than the target date in the set of target dates; and
transmitting the plurality of embedding arrays to a remote computing system over a network, for training a forecasting model.

10. The data processing system of claim 9, further comprising a network interface,
wherein the data processing system is arranged to transmit the plurality of embedding arrays to the remote computing system via the network interface.

11. The data processing system of claim 9, wherein the neural network is a deep neural network, and
the first one or more layers of the deep neural network include one or more recurrent neural network layers.

12. The data processing system of claim 11, wherein the first one or more layers of the deep neural network includes at least one long short-term memory unit.

13. The data processing system of claim 9, wherein the respective target date is a training date of the set of training dates.

14. The data processing system of claim 9, wherein for each training date of the set of training dates, the target output value corresponds to an evaluation of a financial metric at the training date.

15. A non-transitory storage medium comprising machine readable instructions which, when executed by processing circuitry of a data processing system, cause the data processing system to execute a method including:

performing processing to generate a plurality of embedding arrays for a set of target dates, each of the plurality of embedding arrays having a first number of dimensions and representing information associated with a respective target date of the set of target dates, the performing the processing including, for each sequence of dates including training dates from a set of training dates:

receiving, for each training date of a respective sequence of dates, a respective input data array, wherein each respective input data array is received sequentially in a chronological order based on the training dates of the respective sequence of dates, each respective input data array having a second number of dimensions greater than the first number of dimensions and representing values of a predetermined set of date-dependent features;

receiving a target output value corresponding to an evaluation of a predetermined metric for each training date; and performing an update routine including:

processing each respective input data array sequentially received for each training date in the respective sequence of dates using a first one or more layers of a neural network to generate an intermediate data array for a last training date in the respective sequence of dates, wherein the intermediate data array has the first number of dimensions;

processing the intermediate data array using second one or more layers of the neural network to generate a network output value, determining an error between the network output value and the target output value for the last training date in the respective sequence of dates, and updating values of a set of parameters of the neural network in a direction of a negative gradient of the determined error between the network output value and the target output value, wherein, when the update routine has been performed for each training date of the set of training dates, the trained first one or more layers are obtained, and wherein the method further includes:

generating the plurality of embedding arrays using the trained first one or more layers, by processing respective target input data arrays, each respective target input data array corresponding to the respective target date of the set of target dates, wherein, as a result of the processing by the trained first one or more layers, each of the plurality of embedding arrays that corresponds to the respective target date is dependent on the respective input data array for the target date and dates other than the target date in the set of target dates; and transmitting the plurality of embedding arrays to a remote computing system over a network, for training a forecasting model.

\* \* \* \* \*

UNITED STATES PATENT AND TRADEMARK OFFICE
CERTIFICATE OF CORRECTION

PATENT NO. : 12,293,286 B2
APPLICATION NO. : 17/335819
DATED : May 6, 2025
INVENTOR(S) : Peng Wu et al.

Page 1 of 1

It is certified that error appears in the above-identified patent and that said Letters Patent is hereby corrected as shown below:

In the Claims

Column 13, Line 38, Claim 15: delete "using a" and insert -- using --
Column 14, Lines 4-5, Claim 15: delete "dimensions;" and insert -- dimensions, --

Signed and Sealed this
Twenty-second Day of July, 2025

Coke Morgan Stewart
*Acting Director of the United States Patent and Trademark Office*